Patented Sept. 5, 1939

2,172,020

UNITED STATES PATENT OFFICE 2,172,020

PROCESS OF REDUCING CYCLIC CARBONYL COMPOUNDS

Erich Clar, Herrnskretschen, Czechoslovakia, assignor to E. I. du Pont de Nemours & Company, Wilmington, Del., a corporation of Delaware No Drawing. Application November 11, 1937, Serial No. 174,125. In Czechoslovakia May 16, 1936

3 Claims. (Cl. 260—666)

This invention relates to the reduction of organic compounds with zinc dust, and more particularly to the reduction of the carbonyl group (i. e., the =C=O group) of isocyclic and heterocyclic carbonyl-compounds to a hydrocarbon group with zinc dust in a flux of zinc chloride, or mixtures of zinc chloride and alkali metal halide.

It is well known in the art to reduce the carbonyl groups of carbonyl-compounds by means of a zinc dust distillation, the reduction being effected by heating a mixture of the carbonyl body to be reduced and zinc dust, and recovering the reduction products formed by distillation or sublimation. This method suffers from the disadvantage that very high temperatures are generally required, and the yields of the desired products are not satisfactory.

It is an object of this invention to reduce the carbonyl group of carbonyl-carbocyclic and -heterocyclic compounds to a hydrocarbon group using zinc dust as the reducing agent. A further object is to prepare carbocyclic hydrocarbons and heterocyclic compounds from corresponding carbonyl-compounds by reducing said carbonyl-compounds with zinc dust in a facile and efficient manner, free of the disadvantages of the prior art methods. These and other objects will more clearly appear hereinafter.

These objects are accomplished by reducing carbonyl-carbocyclic and carbonyl-heterocyclic compounds with zinc dust in a flux of zinc chloride, or a mixture of zinc chloride and an alkali metal halide.

I have found that if the zinc dust reduction of cyclic carbonyl-compounds is carried out in a medium of zinc chloride or of a mixture of zinc chloride and an alkali metal halide, preferably sodium chloride, the reaction takes place readily at lowered temperatures, preferably between about 200° C. to about 300° C., to form reduction products accompanied by some dimolecular compounds, dissolved in a zinc chloride melt. The reduced cyclic compounds may be separated from the reaction mass by decomposing the melt in dilute acid, and then isolating said compounds by crystallization or by sublimation.

My invention is more clearly illustrated by the following examples:

Example I

A mixture of 1 part of benzophenone, 5 parts of zinc chloride and 1 part of zinc dust are heated to 220° C. The temperature is then raised within a few minutes to 290° C. The diphenyl methane that forms distils off during the heating. The finished fusion mass is then digested in dilute HCl and the tetra phenyl ethylene formed is filtered and washed. It can be separated from zinc dust by extraction with solvents and crystallization, or by sublimation, and is obtained as white needles of a melting point of 221° C.

Example II

One (1) part of anthraquinone, 5 parts of zinc chloride, 1 part of sodium chloride and 1 part of zinc dust are heated while agitating to 220°–280° C. The reaction mass is then digested in dilute acetic acid and the anthracene and 9,9'-dianthryl formed are filtered and washed. The compounds may be separated from zinc dust and from each other by crystallization or fractionated sublimation under vacuum in a current of $CO_2$.

Example III

One (1) part of indanthrone, 5 parts of zinc chloride, 1 part of sodium chloride and 2 parts of zinc dust are heated under agitation to 220°–290° C. The finished reaction mass is drowned onto dilute hydrochloric acid and the 1,2,1',2'-anthrazine formed is filtered and washed. It may be separated from zinc dust by a vacuum sublimation at 350° C. in the presence of $CO_2$.

The process of my invention is by no means limited to the reduction of the carbonyl-compounds of the above examples but rather, is of wide and general application. For example: 2-chloro-anthraquinone may be reduced to anthracene; phenanthraquinone is reduced to phenanthrene and 9,9'-diphenyl-anthryl; anthanthrone is reduced to anthanthrene; violanthrone is reduced to violanthrene; xanthone is reduced to xanthene; thioxanthone is reduced to thioxanthene; and acridone is reduced to acridene, when operating under the conditions of my process.

It is obvious, of course, that the optimum temperatures necessary for the reduction will depend upon the compounds to be reduced, but temperatures between 200° and 300° C. were found suitable in most cases. The reaction time, too, depends upon the ease with which the keto group of a given carbonyl-compound can be reduced and may vary from a few minutes to several hours.

Zinc chloride acts not only as a solvent in which the reduction is being run but it actually activates the zinc dust and increases its efficiency. The amount of zinc chloride to be used may vary within wide limits, usually enough of it is used to obtain a fairly fluid reaction mass.

The fluidity of the reaction mass is increased and its melting point is decreased if alkali metal halides are added to the zinc chloride. The use of alkali metal halides appears not only to reduce the fusion point but also to retard the formation of bimolecular compounds, and thus increase the yield of the hydrocarbons wanted.

Zinc chloride need not be strictly anhydrous. Indeed, I have found that absolutely anhydrous zinc chloride promotes, especially in the absence of alkali metal halides, the formation of the less desirable bimolecular compounds.

The reduction may be performed in closed vessels under pressure if the starting materials should be too volatile.

My invention is not limited to the materials and conditions listed above, it being understood that all obvious variations and equivalents falling within the spirit of my invention are to be included within the scope thereof as defined by the following claims.

I claim:

1. A process of reducing cyclic carbonyl compounds to the corresponding hydrocarbon which comprises heating the cyclic carbonyl compound with zinc dust and zinc chloride at reduction temperature until reduction to the corresponding hydrocarbon is complete, and isolating said corresponding hydrocarbon from the reaction mass.

2. A process of reducing cyclic carbonyl compounds to the corresponding hydrocarbon which comprises heating the cyclic carbonyl compound with zinc dust, zinc chloride and an alkali metal halide at reduction temperature until reduction to the corresponding hydrocarbon is complete, and isolating said corresponding hydrocarbon from the reaction mass.

3. A process according to claim 2 wherein the alkali metal halide is sodium chloride.

ERICH CLAR.